May 3, 1938.                     K. R. MOSER                    2,116,248
                       APPARATUS FOR MAKING CORE BOXES
                          Filed Nov. 27, 1936              3 Sheets-Sheet 2
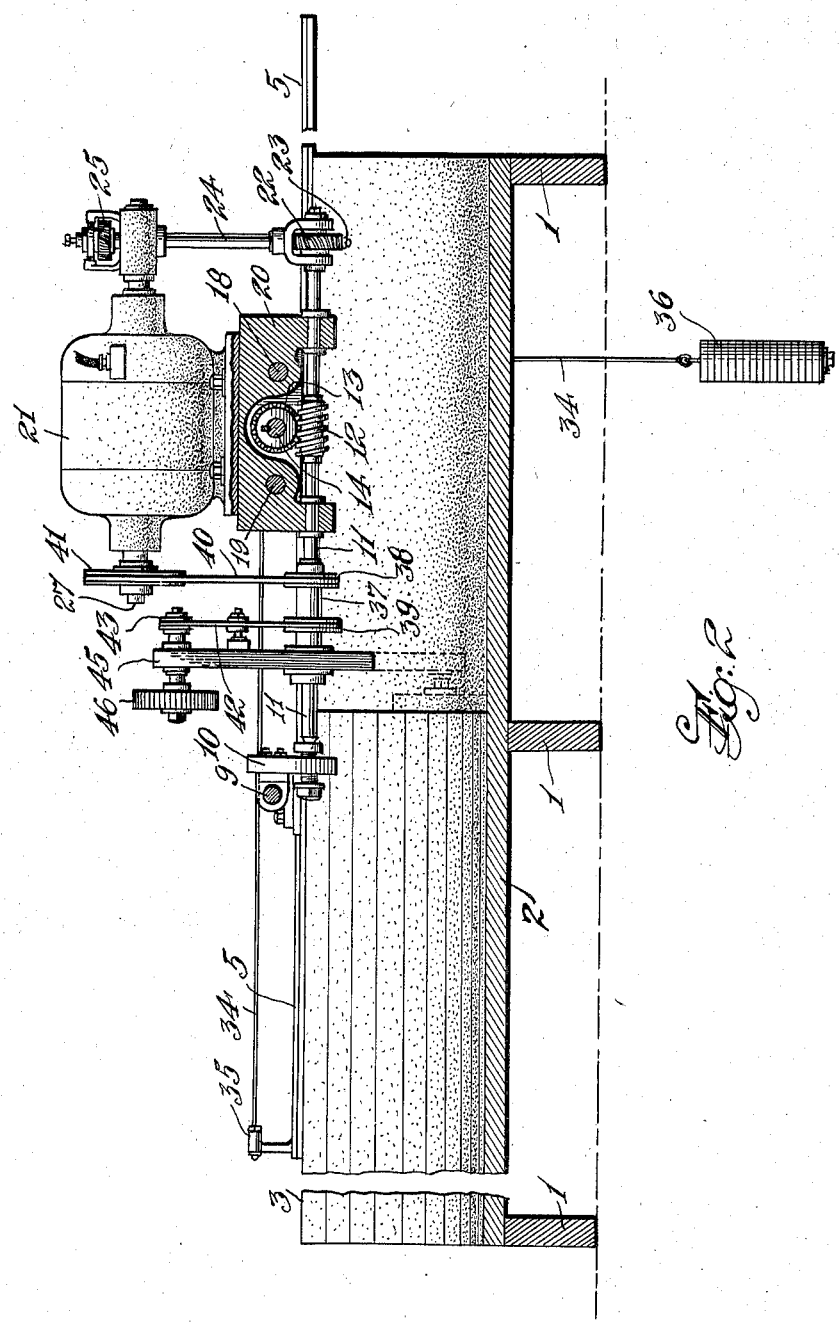
INVENTOR
Karl Moser
BY Fredk C. Fischer
ATTORNEY

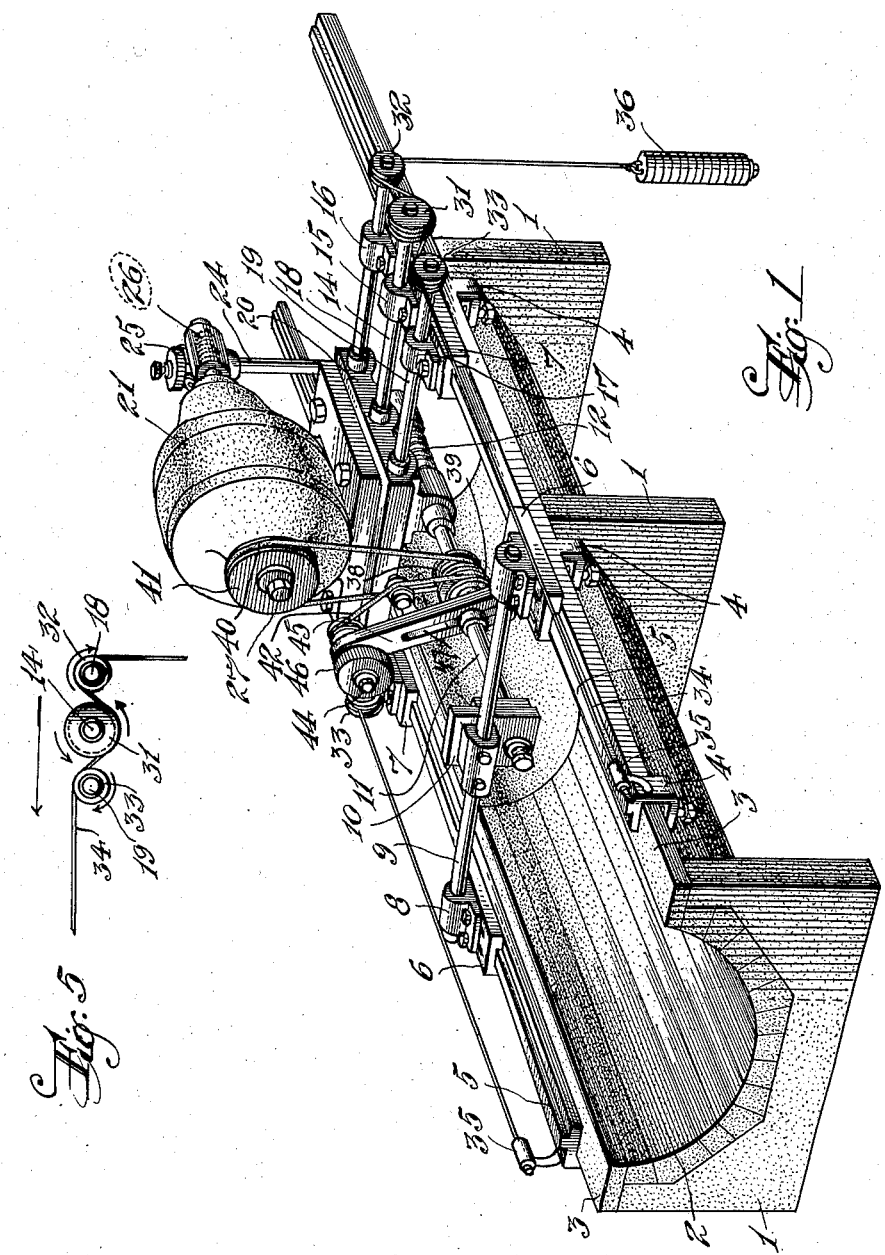

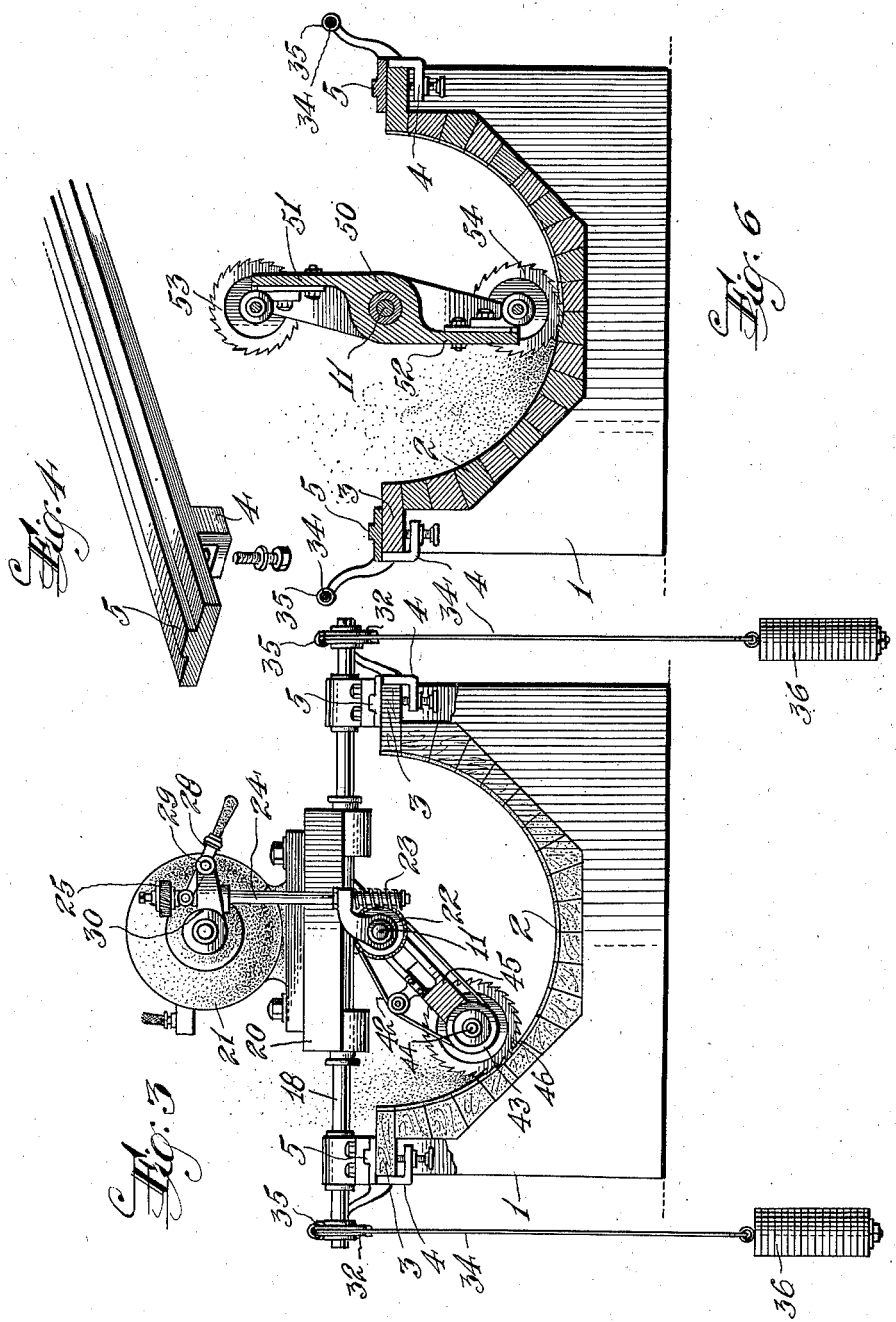

Patented May 3, 1938

2,116,248

UNITED STATES PATENT OFFICE 2,116,248

APPARATUS FOR MAKING CORE BOXES

Karl R. Moser, Elizabeth, N. J.

Application November 27, 1936, Serial No. 112,909

4 Claims. (Cl. 144—2)

This invention relates to improvements in devices and apparatus for cutting core boxes.

In the cutting of core boxes, heretofore, the operations have been performed by hand and the process was somewhat tedious and exacting, requiring a high degree of skill and care on the part of the operator in order to produce a first-class article.

It is an object of this invention to provide a machine for cutting core boxes of wood or similar material which requires no manual operations and which obviously eliminates the human element, insuring accurate and precise cutting of the core box.

A further object is the provision of an apparatus for cutting core boxes of wood or similar material which is readily adaptable for cutting various shapes of cores at a relatively rapid rate with a high degree of accuracy and labor-saving.

A further object is the provision of a device for cutting or shaping articles of any description, which device or apparatus is so constructed that it can be mounted upon the article which it cuts or shapes, thereby enabling the device to be employed in many situations which heretofore presented considerable difficulty.

These and other advantageous objects, which will later appear, are accomplished by the simple and practical construction and arrangement of parts hereinafter described and exhibited in the accompanying drawings, forming part hereof, and in which:

Fig. 1 is a perspective view of the core box cutting apparatus embodying my invention, Fig. 2 is an elevational view in section of the apparatus, Fig. 3 is a rear view of the apparatus, Fig. 4 is a perspective view of guide members used in the apparatus, Fig. 5 is a view of a tightening device forming a part of the apparatus, Fig. 6 is an end view of a portion of the apparatus showing a modified form of cutter, Referring to the drawings, in Fig. 1 is shown the support 1 for a block 2 of wood or similar material from which the core box is to be cut, said block being provided with side bars 3 to which are fixed by means of clamps 4 guide rails 5 receiving channel members 6 and 7. Channel members 6 support bearings 8 which receive a cross shaft 9, the latter adjustably supporting a bracket 10 which in turn rotatably supports a drive shaft 11, having fixed thereto a worm gear 12 which engages a worm wheel 13 fixed to a shaft 14 journalled in bearings 15 supported by the channel members 7. On each side of the bearings 15 are bearings 16 and 17 which respectively receive shafts 18 and 19 which are rotatably supported by a base 20 upon which is mounted an electric motor 21. At the rear end of shaft 11 is fixed a worm gear 22 in mesh with a vertical worm gear 23 fixed to a vertical shaft 24 which has splined to the upper end thereof a worm gear 25 adapted to be moved into and out of mesh with a worm gear 26 attached to the shaft 27 of the motor. The gear 25 is shifted by means of a lever 28 fulcrumed at 29 on a bracket 30 supported by the motor casing.

Attached to the end of shafts 14, 18 and 19, are respectively, pulleys 31, 32 and 33. A cable 34 fixed at 35 to the forward end of the guide rail 5 passes over pulley 33 and is looped around pulley 31 and then upward over pulley 32, and then attached to weight 36.

By means of this arrangement, when the shaft 11 rotates, the pulley 31 is caused to rotate and produce a binding on the cable due to the looping of the cable about pulley 31, which tends constantly to urge the motor and other parts supported by the channel members 6 and 7, forwardly as a unit (see Fig. 5).

Loosely mounted on shaft 11 is a collar or sleeve 37 having fixed at each end thereof pulleys 38 and 39. A belt 40 passes over pulley 38 and also over a larger pulley 41 attached to the forward end of the motor shaft 27. A belt 42 passes over pulley 39 and over a smaller pulley 43 attached to a shaft 44 rotatably mounted in the end of an arm 45, the shaft 44 having fixed to the other end thereof a cutter 46. The other end of the arm 45 is fixed to the shaft 11 and rotates therewith. The arm 45 is provided with a longitudinal slot 47 by means of which its length can be adjusted relative to the shaft 11.

In operation, it will be seen that the shaft 11 derives its power through the worm 26, worm wheel 25, vertical shaft 24, worm gear 23 and worm wheel 22. Shaft 14 rotates at a relatively low speed. On the other hand, the cutter 46 derives its power from the forward end of the motor through pulleys 41, 38, 39 and 43, and rotates at high speeds. As the apparatus is moved as a unitary mechanism along the guide rails 5, the arm 45 is caused to rotate and the cutter 46 engages the block from which the core box is to be made and step-by-step automatically cuts the block to form the core box.

It will be seen that the operation is entirely mechanical and accordingly adapted to accuracy, eliminating the human element, and enabling the production of core boxes of a high quality.

The apparatus as described in connection with Fig. 1 it will be seen, only cuts the block during one-half revolution of the arm 45. In order that there can be a constant cutting of the block, in Fig. 6, is shown a modified form of cutter, in which member 50 has arms 51 and 52 extending in opposite directions from the shaft 11.

The arms 51 and 52 have mounted at the ends thereof pulleys and cutters 53 and 54 similar to the pulleys 43 and 46 as described in connection with Fig. 1. As the member 50 rotates with the shaft 11, it will be seen that there will always be a cutter in engagement with the block; as cutter 54 leaves the block, the cutter 53 will be moved into cutting position, thus assuring constant cutting of the core box and speeding up the operation.

From the above description, it will be seen that I have provided a relatively simple and effective apparatus for accurately and rapidly forming core boxes which eliminates considerable manual labor and the human element. While the device is described in connection with the cutting of core boxes, obviously it can be readily employed for cutting and forming other articles without departing from the spirit of the invention.

It will be noted that the apparatus is mounted directly upon the article which it cuts; and this arrangement obviously enables the device to be used in many situations which heretofore have presented difficult problems.

The foregoing disclosure is to be regarded as descriptive and illustrative only, and not as restrictive or limitative of the invention, of which obviously many embodiments may be constructed, including many modifications, without departing from the general scope herein indicated and denoted in the appended claims.

Having thus described my invention, what I claim as new and desire to secure by Letters Patent, is:

1. In an apparatus of the class described, a pair of guide rails, a plurality of pairs of channelled members slidably mounted on the guide rails, a cross bar supported by one pair of channelled members, transverse shafts rotatably supported by pairs of said members, a platform supported by said transverse shafts, a motor mounted on the platform and having a shaft, a longitudinal shaft supported by the platform and by said cross bar, means for driving said longitudinal shaft by the shaft of the motor, means for driving said transverse shafts by the longitudinal shaft, an arm fixed to the longitudinal shaft, a stub shaft rotatably mounted in the free end of the arm, a first pulley attached to the stub shaft, a cutter attached to the stub shaft, a sleeve rotatably mounted on the longitudinal shaft, a second pulley fixed to said sleeve to rotate therewith, a belt connecting the first and second pulleys, means to rotate the sleeve directly by the motor shaft, and means controlled by the rotation of the transverse shafts to move the channelled members along the guide rails.

2. In an apparatus of the class described, a pair of guide rails, a plurality of pairs of members slidably mounted on the guide rails, a cross bar supported by one pair of said members, transverse shafts rotatably supported by pairs of said members, a platform supported by said transverse shafts, a motor mounted on the platform and having a shaft, a longitudinal shaft supported by the platform and by said cross bar, means for driving said longitudinal shaft by the shaft of the motor, means for driving said transverse shafts by the longitudinal shaft, an arm fixed to the longitudinal shaft, a stub shaft rotatably mounted in the free end of the arm, a first pulley attached to the stub shaft, a cutter fixed to the stub shaft, a second pulley rotatably mounted on said longitudinal shaft, a belt connecting the first and second pulley, means to rotate said second pulley directly by the motor of the shaft, and means controlled by the rotation of the transverse shafts to move said members along the guide rails.

3. In an apparatus of the class described, a pair of guide rails, a plurality of pairs of members slidably mounted on the guide rails, a cross bar supported by one pair of said members, transverse shafts rotatably supported by pairs of said members, a platform supported by said transverse shafts, a motor mounted on the platform and having a shaft, a longitudinal shaft supported by the platform and by said cross bar, means for driving said longitudinal shaft by the shaft of the motor, means for driving said transverse shafts by the longitudinal shaft, an arm fixed to the longitudinal shaft, a stub shaft rotatably mounted in the free end of the arm, a first pulley attached to the stub shaft, a cutter fixed to the stub shaft, a second pulley rotatably mounted on said longitudinal shaft, a belt connecting the first and second pulley, means to rotate said second pulley directly by the motor of the shaft, pulleys attached to three of said transverse shafts, cables attached to the forward ends of the guide rails, said cables passing over two of said pulleys and encircling the other pulleys, and weights attached to the other ends of the cable so that rotation of the transverse shafts will cause said members to move along the guide rails.

4. In an apparatus for making core boxes, a unitary mechanism comprising a motor having a shaft upon opposite ends of which a worm gear and a pulley are respectively mounted, a drive shaft mounted in parallel relation to the motor shaft and operated therefrom by a vertical connecting shaft connected thereto by worm and gear mechanisms, one of which is adapted to be disengaged therefrom, an arm mounted on said drive shaft, a cutter rotatably mounted at the outer end of said arm, a sleeve carried by and rotatable on said drive shaft and operatively connected to and rotated by said pulley on said motor shaft, rotating means connecting said sleeve and cutter, a shaft mounted and extending transversely between said motor and drive shafts and having pulleys mounted upon its outer ends and idler pulleys mounted on either side thereof in alignment therewith, a worm and gear connecting said pulley and drive shafts, a cable looped over the intermediate pulley and passing over the idler pulleys on both sides, and guide rails adapted to be attached to the block from which the core box is made, one end of each cable being attached to the forward ends, respectively, of said guide rails and having weights attached to the opposite ends, the rotation of said intermediate pulleys moving the mechanism as a unit on said guide rails.

KARL R. MOSER.